United States Patent [19]

Mei et al.

[11] Patent Number: 5,325,797
[45] Date of Patent: Jul. 5, 1994

[54] STAGED FLUIDIZED-BED COMBUSTION AND FILTER SYSTEM

[75] Inventors: Joseph S. Mei, Morgantown, W. Va.; John S. Halow, Waynesburg, Pa.

[73] Assignee: The United States of America as represented by the United States Department of Energy, Washington, D.C.

[21] Appl. No.: 108,501

[22] Filed: Aug. 18, 1993

[51] Int. Cl.$^5$ ............................................. F23G 5/00
[52] U.S. Cl. .................................. 110/245; 110/211; 110/214; 110/229; 122/4 D; 422/142; 422/147; 588/900
[58] Field of Search ............... 110/245, 229, 211, 214, 110/346; 431/7, 170; 422/141, 142, 147; 588/261, 900; 122/4 D

[56] References Cited

U.S. PATENT DOCUMENTS

| | | | |
|---|---|---|---|
| 3,888,193 | 6/1975 | Kishigami et al. | 110/245 |
| 4,325,327 | 4/1982 | Kantesaria et al. | 122/4 D |
| 4,432,290 | 2/1984 | Ishii et al. | 110/346 |
| 4,877,397 | 10/1989 | Tatebayashi et al. | 110/245 X |
| 5,253,741 | 10/1993 | Gorzegno | 110/245 X |

OTHER PUBLICATIONS

Chong, Y. O., et al., "Solids Circulation Between Adjacent Fluidized Beds Without Gas Mixing", *Proceedings of the First International Conference on Circulating Fluidized Beds*, Halifax, Nova Scotia, Canada Nov. 18–20, 1985.
Meile, L. J., et al., "Rocky Flats Plant, Fluidized Bed Incinerator", printed Mar. 8. 1982.
Lui, A. P., et al., "Application of a Twin Fluidized-Bed Reactor for Retorting/Combustion and Gasification/Combustion Processes, *Proceedings of the Eight International Conference on Fluidized Bed Combustion, vol. III'*, by Special Projects Branch, Coal Projects Management Division, Jul. 1985.
Brown, R. C., et al, "Load Turndown in a Two-Bed Fluidized Combustor", 1989 *International Conference on Fluidized Bed Combustion*, Apr. 30–May 3, 1989.

*Primary Examiner*—Edward G. Favors
*Attorney, Agent, or Firm*—David E. Breeden; Stephen D. Hamel; William R. Moser

[57] ABSTRACT

A staged fluidized-bed combustion and filter system for substantially reducing the quantity of waste through the complete combustion into ash-type solids and gaseous products. The device has two fluidized-bed portions, the first primarily as a combustor/pyrolyzer bed, and the second as a combustor/filter bed. The two portions each have internal baffles to define stages so that material moving therein as fluidized beds travel in an extended route through those stages. Fluidization and movement is achieved by the introduction of gases into each stage through a directional nozzle. Gases produced in the combustor/pyrolyzer bed are permitted to travel into corresponding stages of the combustor/filter bed through screen filters that permit gas flow but inhibit solids flow. Any catalyst used in the combustor/filter bed is recycled. The two beds share a common wall to minimize total volume of the system. A slightly modified embodiment can be used for hot gas desulfurization and sorbent regeneration. Either side-by-side rectangular beds or concentric beds can be used. The system is particularly suited to the processing of radioactive and chemically hazardous waste.

19 Claims, 8 Drawing Sheets

STAGED FLUIDIZED-BED COMBUSTION AND FILTER SYSTEM

DESCRIPTION

The U. S. Government has rights in this invention pursuant to the employer-employee relationship between the U. S. Department of Energy and the inventors.

TECHNICAL FIELD

The present invention relates generally to the combustion of materials to reduce environmental and economic problems, and more particularly to the combustion of hazardous waste, especially radioactive and chemically hazardous waste. Application is also to hot gas desulfurization. The particular technology relates to fluidized bed combustion and the filtration of particulates resulting from the combustion.

BACKGROUND ART

Disposal of material contaminated with radioactive materials or chemically hazardous materials present substantial environmental and economic problems. Burial (land fill disposal) of these types of waste materials involve complex technical and socioeconomic-economic problems. In the case of radioactively-contaminated wastes, a substantial reduction in the volume of the wastes to be disposed is feasible since a large portion of the waste consists of organic material. With chemically hazardous wastes large volume reductions are also usually possible. Various methods have been tested to reduce waste volume, including conventional combustion, and staged and fluidized bed combustion.

Typical of the prior art are described in:
1. "Rocky Flats Plant Fluidized Bed Incinerator", L. J. Meile, et al, Report RFP-3249, Mar. 8, 1982.
2. "Circulating Fluidized Bed Technology", Proc. First International Conference on Circulating Fluidized Beds, Ed. P. Basu, November 1985.
3. "Proceedings of the Eighth International Conference on Fluidized-Bed Combustion, Vol. III", Report DOE/METC-85/6021, March 1985.
4. "1989 International Conference on Fluidized Bed Combustion, FBC—Technology for Today", ASME April–May 1989.

The above-cited references are incorporated herein by reference for any teachings of process parameters with regard to fluidization, combustion, filtration, etc.

The known techniques all have disadvantages when applied to radioactive and hazardous wastes. Low level radioactive wastes generally consist of a mixture of items such as contaminated gloves and clothing, contaminated wood and building materials, contaminated oils and lubricants, and miscellaneous other items. Primary concerns in the combustion of these materials is, of course, the retention of all radioactive material with the ash of combustion. These wastes typically contain large amounts of plastics with chlorine-containing compounds; therefore, conditions must be maintained to avoid the formation of volatile chlorides of radioactive elements and/or chlorine-containing organic compounds such as dioxins. Avoidance of the potential for criticality, when fissionable materials are present, is also an important consideration.

As stated above, fluidized bed combustion has been investigated as a means of reducing both the volume and weight of radioactive solid and liquid wastes. Some of the valuable characteristics of fluidized bed combustion with regard to this application are:
1) high combustion efficiency at relatively low temperature (about 550° C.), resulting in a low-fired ash to enhance actinide recovery (if needed) and the elimination of refractory materials of construction which otherwise would create a secondary waste material when replaced;
2) acids produced during combustion can be neutralized in-situ, as with sodium carbonate media, to eliminate off-gas scrubbing;
3) only a dry filter system is needed since only particulate material and not gases must be removed, with the elimination of the need to process aqueous scrubbing solutions.

Although conventional fluidized bed combustion systems for radioactive wastes have these attractive features, the also have some undesirable features. For example, although the off-gas can be dry, carryover of particles from the bed still requires the use of various separators in the form of cyclones and banks of filters. These devices create higher pressure drops across the system, and add significantly to costs. Probably the most important drawback is the requirement for additional separate vessels, piping and hardware that becomes contaminated with radioactivity and complicates repairs and maintenance. Furthermore, because single fluidized bed reactors do not provide a uniform residence time for particles in the bed, some of the waste residue can be carried out of the bed or discharged before all organic matter has been consumed. Also, any chloride sorbent and oxidation catalyst is not fully utilized in a single bed system with the result that there is additional material for disposal.

Accordingly, it is an object of the present invention to provide a system for the fluidized bed combustion of waste which minimizes components subject to contamination that must be disposed of during maintenance and repair.

It is another object of the present invention to provide apparatus for the complete combustion of waste, such as hazardous chemical and radioactive waste, that permits retention of particulates as well as the in situ neutralization of acids.

A further object of the present invention is to provide a combined multi-stage combustion system coupled with filtration such that improved processing of hazardous waste is accomplished with a reduction of apparatus.

It is also an object of the present invention to provide a unique combination of filtration and staging features that involves a combined fluidized bed filter and staged pyrolysis/combustor.

Another object of the present invention is to provide a multi-staged combustion and filtration system for the desulfurization and regeneration of gases.

These and other objects of the present invention will become apparent upon a consideration of the drawings referred to hereinafter, together with a complete description thereof.

DISCLOSURE OF THE INVENTION

In accordance with the present invention, there is provided a system having two side-by-side fluidized beds, one being a primary fluidized-bed pyrolyzer/combustor, and the second being an after-burning fluidized-bed combustor/filter. Gas flow is staged through the two fluidized beds while solids flow through the beds is independent between the two portions. This provides for gas exiting the pyrolyzer/combustor to pass through the after-burning combustor/filter, while each bed is baffled in a manner to cause staging of the solids within each bed independently. In addition, unique metal filters are used to separate exiting gas from the solids in each bed. These filters retain essentially all particulate matter within the fluidized beds.

BEST MODE FOR CARRYING OUT THE INVENTION

Figure 1:
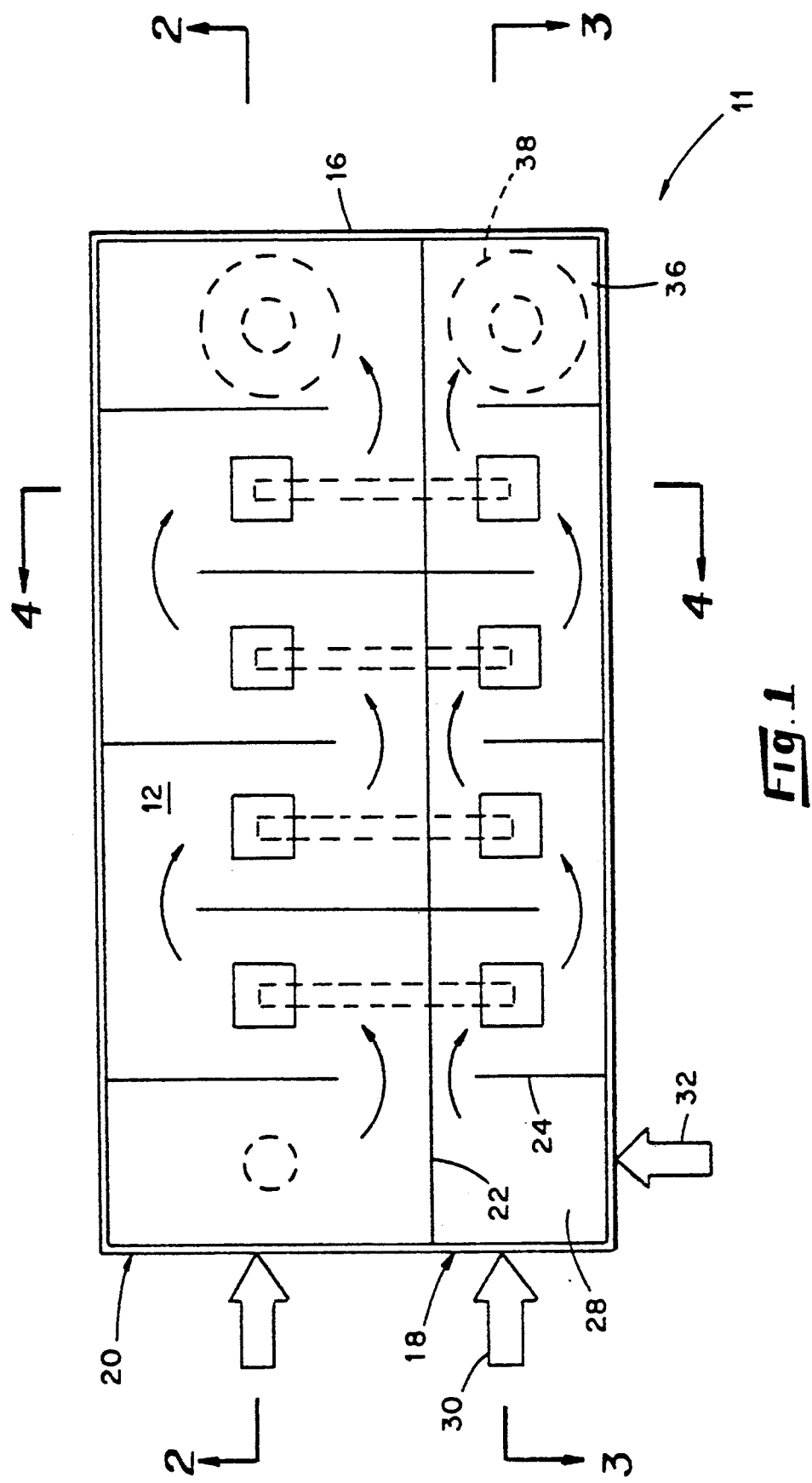
FIG. 1 is a horizontal cross-section, in schematic form, of apparatus utilizing the two side-by-side fluidized beds to accomplish pyrolysis/combustion and combustion/filtration to process waste.
Figure 2:
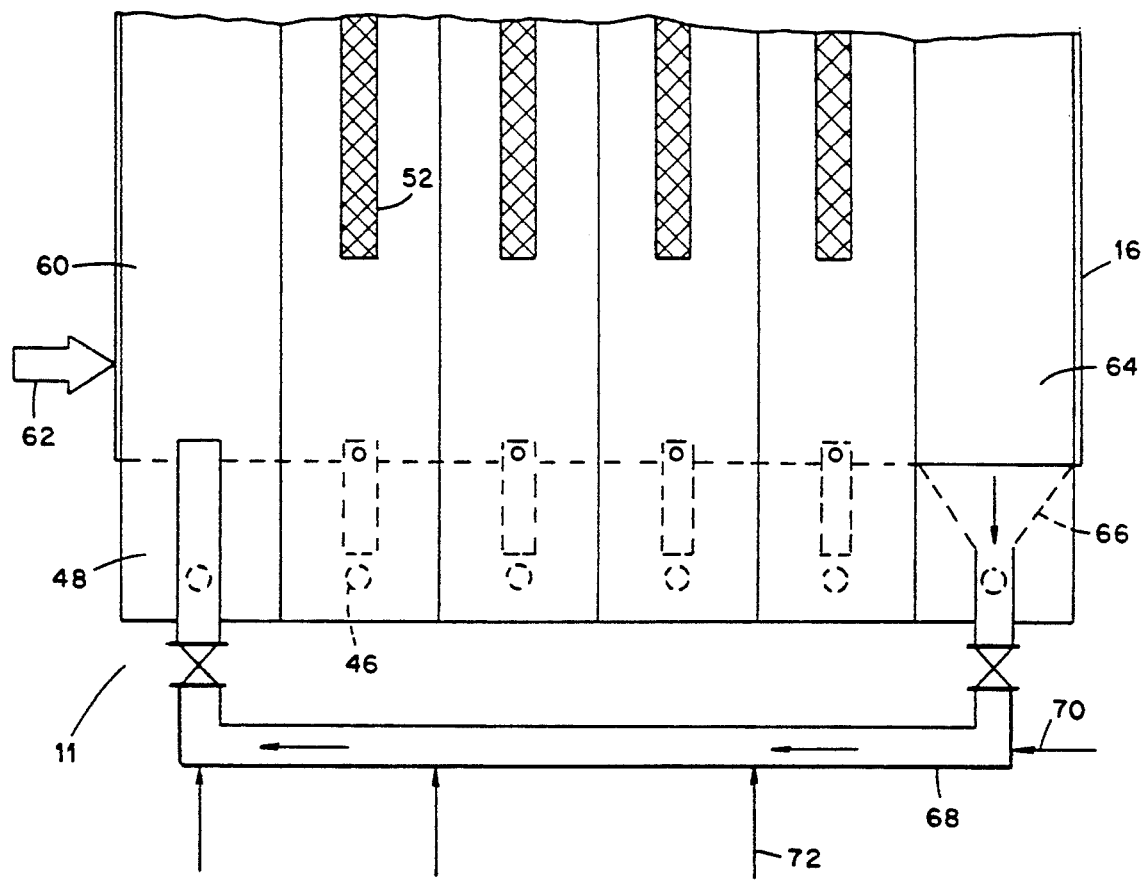
FIG. 2 is a vertical cross-section, in schematic form, of the combustion/filtration portion of the present invention taken at 2—2 of FIG. 1.
Figure 3:
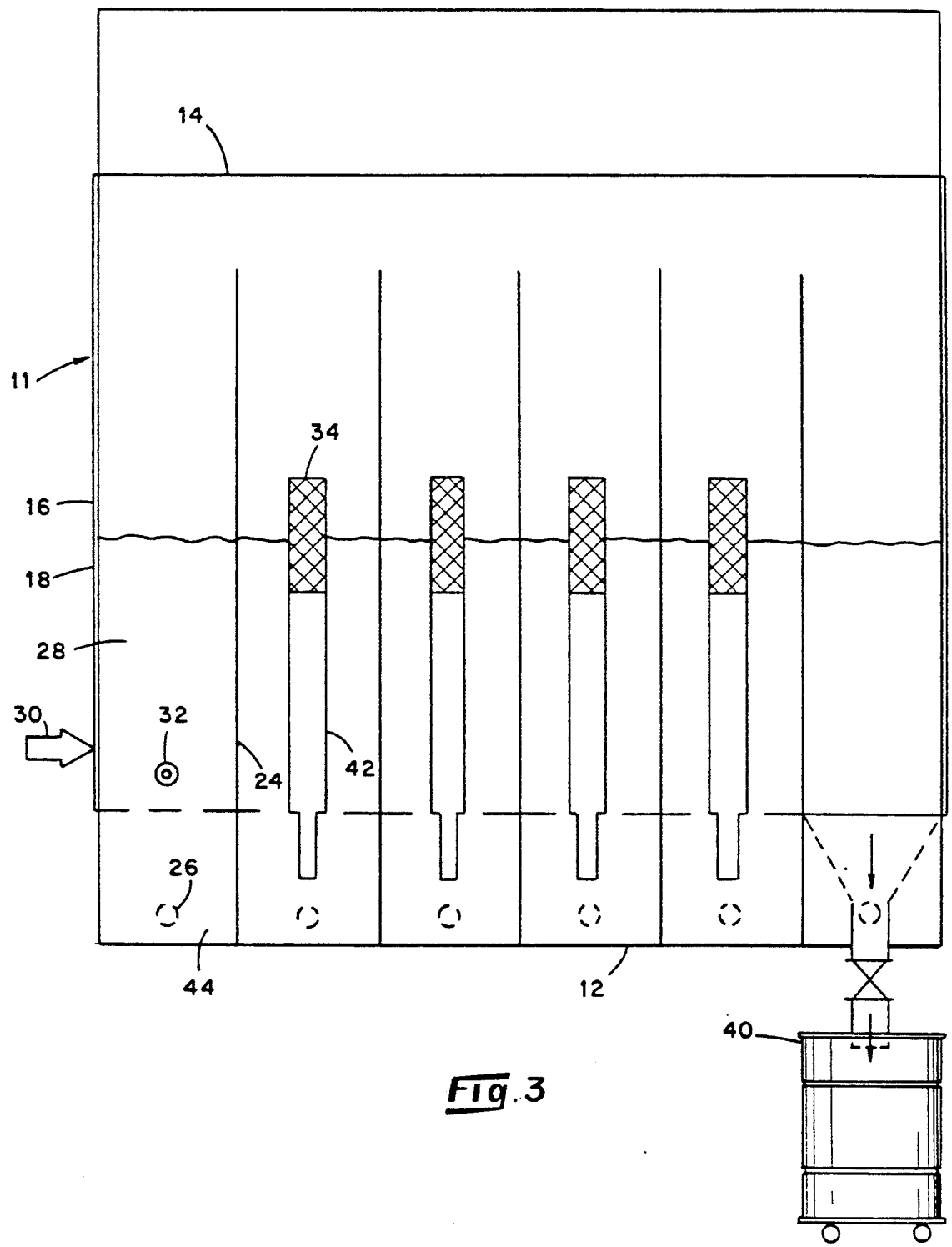
FIG. 3 is a vertical cross-section, in schematic form, of the pyrolysis/combustion portion of the present invention taken at 3—3 of FIG. 1.

One embodiment of the present invention is illustrated generally at 11 in FIGS. 1-3. The enclosure is formed from a bottom member 12, a top member 14 (see FIG. 3), and side walls 16. Preferably, this enclosure is provided with cooling, such as having at least the side walls 16 being formed from water jackets. This device 11 has side-by-side fluidized beds in the form of a primary pyrolyzer/combustor portion 18 and an after-burning combustor/filter portion 20, the two portions being separated by an internal wall 22. Typically, the portions be and 20 are about thirty-six inches in length, and about thirty-six inches in height. The pyrolyzer/combustor portion typically has a width of about six inches, and the combustor/filter portion typically has a width of about twelve inches. Of course, the size can be varied to accommodate a specific quantity of waste to be processed.

The pyrolyzer/combustor portion (see also FIG. 3) is divided into six stages by baffles, such as that illustrated at 24. These alternate extending from the side walls 16 and the dividing wall 22 such that the waste moves in an extended path through the stages. As shown in FIG. 3, these baffles extend from approximately the gas distributors 26 to the freeboard, i.e., the top of any waste being processed therein: Solid and/or liquid waste, and any catalyst and sorbent, are fed into the bottom of the first compartment 28 as indicated at 30 and 32. Any solids must be sufficiently small in size such that they can be transported through the apparatus by the flow of a gas. Sorbent (typically sodium carbonate) is added to absorb acidic gases released during combustion. A catalyst (typically an alkali salt) is added to enhance the combustion process at the relatively low combustion temperature needed to prevent vaporization of contaminants of the waste, such as plutonium and other radioactive compounds. The organic components of the waste is decomposed to gaseous hydrocarbons or other gases as the waste travels through the stages by partial combustion and pyrolysis. These gases are transported to the combustion/filter bed 20 where they are consumed by combustion under high excess air conditions.

Particulates are separated from the gas and retained entirely in the pyrolyzer/combustor bed 18 by metal screen filters 34 contained in each baffled zone of the bed (see FIG. 3). These filters are either sealed at the top or are always totally submerged in the fluidized bed. The screen of the filter causes a layer of bed particles to coat the surface of the filters. Thus, the particles themselves form a filtration media. This particle layer retains much smaller fine particles in the bed than a screen alone. These filters can be circular, square or other shape in cross-section. Details of these filters are contained in U.S. Pat. No. 5,198,002, issued Mar. 30, 1993, which is incorporated herein by reference.

Char remaining after pyrolysis in the first baffled zone 28 of the pyrolyzer/combustor 18 travels through the subsequent stages pushed through by the directional flow of the gas through the distributors 26. Complete combustion of this char is accomplished because of the relatively long residence time in the unit provided by the staging. Further, since the fluidization process in each stage is individually controlled through separate gas plenum chambers, higher excess air can be provided in the later stages to ensure this complete combustion. In addition, staging will improve both sorbent and catalyst utilization over that achieved in conventional fluidized-bed reactors. Any ash formed from the combustion of the char is removed from the final stage 36 via a conical drain unit 38 where the ash can be deposited in a collector 40.

Figure 4:
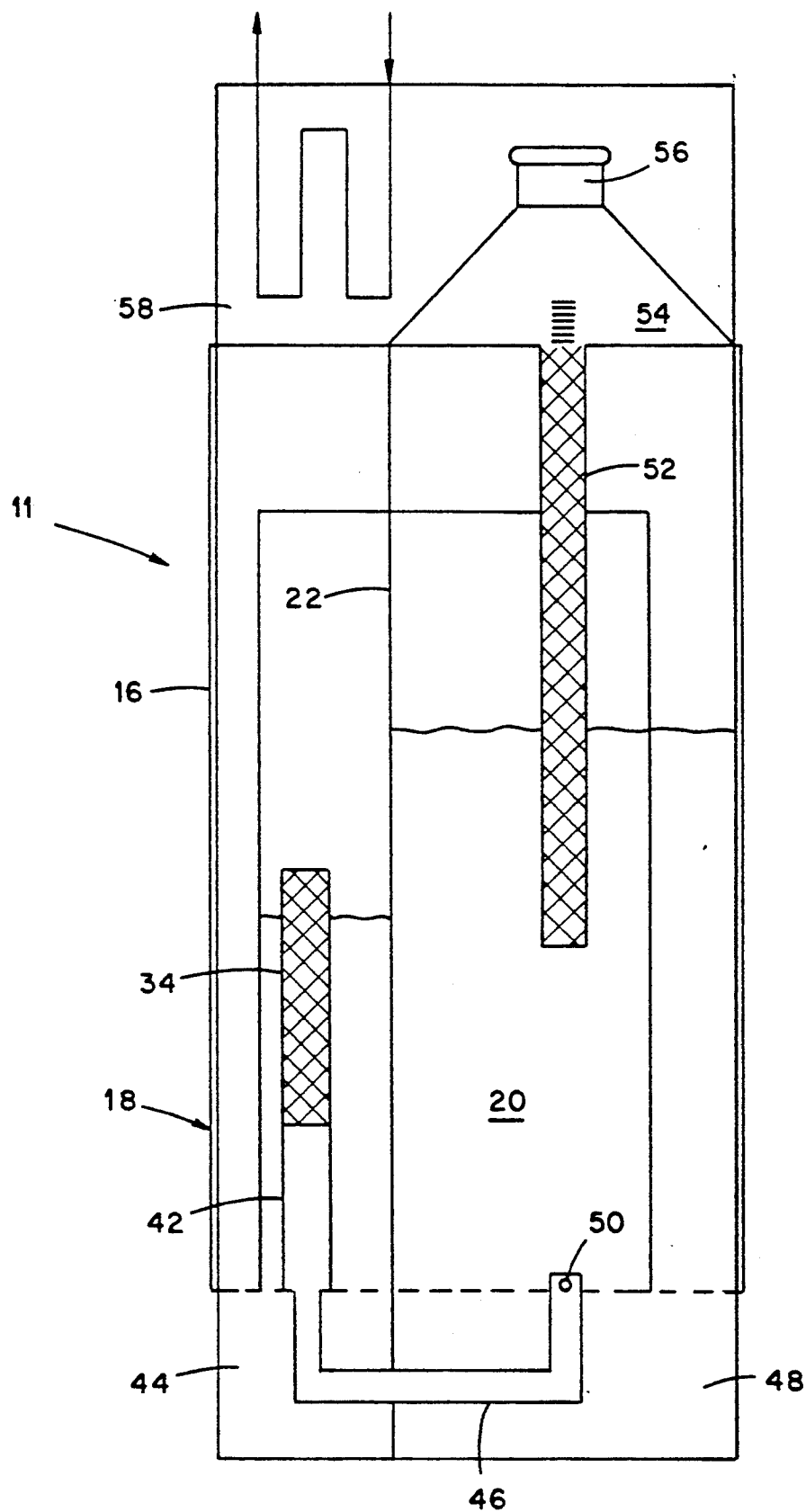
FIG. 4 is a vertical cross-section, in schematic form, that is transverse to the cross-sections of FIGS. 2 and 3 taken at 4—4 of FIG. 1.

As stated above, the screen filters 34 in the pyrolyzer/combustor section 18 are sealed on their tops. The lower ends are attached to pipes 42 protruding from the gas distributor plenum 44, as shown in FIGS. 3 and 4. These pipes are connected to horizontal pipes 46 which pass through the wall 22 between the two plenum chambers 18, 20. The horizontal connecting pipes bend upwardly so as to enter the gas distributor plenum 48 of the after-burning combustor/filter bed such that they terminate a short distance above gas distributors 50 of the combustor/filter unit 20. An alternate design utilizes termination of the pipes 46 below the distributors 50 so that the gases mix with fresh air in the plenum 48. In this way, the combustion is staged so that any volatiles released in the pyrolysis/combustion bed 18 are consumed in the combustion/filter bed 20.

The second fluidized bed, i.e., the combustor/filter bed 20 provides a high excess air environment for complete combustion of the hydrocarbon gases from the first bed (i.e, the pyrolysis/combustor bed 18), together with complete filtration by filters 52. Since this bed 20 must accommodate the gases from the first bed 18 as well as excess air, its area is approximately double the area of the first bed 18. Any radioactive material, if present in the waste entering the system, is retained in the pyrolysis/combustor bed 18. Accordingly, criticality and contamination are not particular issues when the filters 34 of the first bed 18 function properly. The final filtration is accomplished with the suspended filters 52. Gas is exhausted via a clean gas chamber 54, containing a final filter element 56. Gas, after passing through the filter 56 is cooled to a reasonable discharge temperature by passing through a water-cooled heat exchanger 58. A portion of this cooled gas is pressurized and recirculated to the pyrolyzer/combustor bed 18 to be reused as fluidizing gas. This minimizes the volume of gas leaving the system 10.

Catalyst introduction into the combustor/filter unit 20 is into a first stage 60 at entry 62 as indicated in FIG. 2. This catalyst is conveyed through the unit using the air input in each stage. The catalyst and any other solids are removed in a final stage 64 using a conical distributor 66, with these materials then being recycled via a pneumatic transport line 68 and driven by additional gas, as at 70. It may be desirable to have gas entry ports, as at 72, along the transport line 68 to prevent settling of the catalyst prior to reintroduction into the first stage 60 to improve catalyst utilization.

Figure 5:
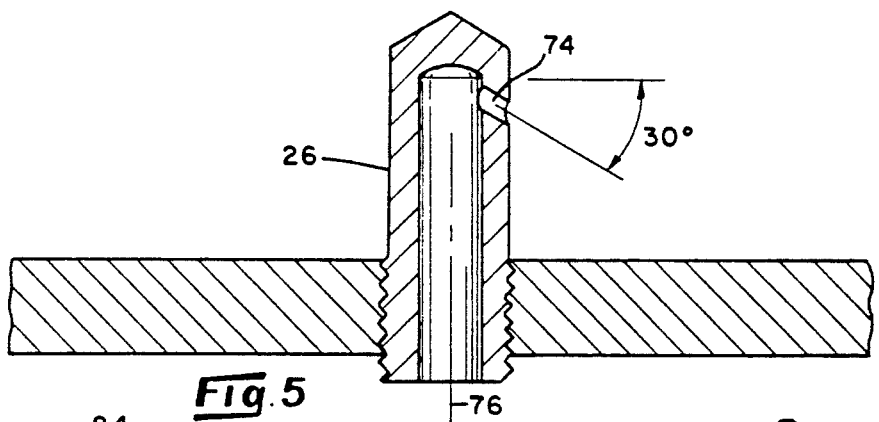
FIG. 5 is a cross-section of a typical gas bubble cap nozzle utilized in the stages of the present invention.

As stated above, the introduction of gas into the two fluidized beds 18, 20 give rise to the transport of solids therein. This gas is introduced through directional distribution nozzles 26, such as those illustrated in FIG. 5. These distributors have a single hole 74 whose center line is slanted at about a thirty degree angle relative to a normal to the axis 76 of the distributor, i.e., a sixty degree angle relative to the axis. With this construction, each distribution nozzle can be oriented around its axis for proper circulation of the bed material in each stage.

A particular constraint of operating conditions of the present unit 11, particularly when processing waste containing radioactive material is to maintain the temperature within the system below about 600° C. Primary temperature control is afforded by the water-cooled side walls 16 as stated above. Heat transfer from the bed to this water-jacket type of side wall is very effective due to the motion of the solids within the beds. Furthermore, control of temperature for individual stages can be fine-tuned by the already cooled recirculated off-gas or make-up gas.

The system can be fabricated from any material that is compatible with the waste to be processed. For example, for waste containing radioactivity, stainless steel components are used. Further, some individual components can be replaced with little hazard to maintenance workers. These components would include, for example, the metal filters, the gas distributors, etc. Should undesirable levels of contamination occur, the entire unit 11 could be discarded.

Figure 6:
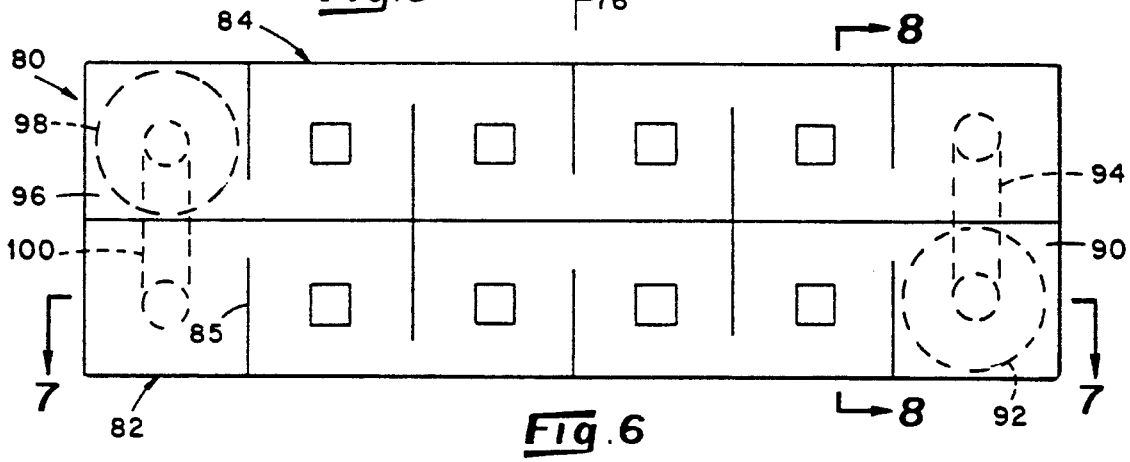
FIG. 6 is a horizontal cross-section, in schematic form, of an embodiment of the present invention used for desulfurization.
Figure 7:
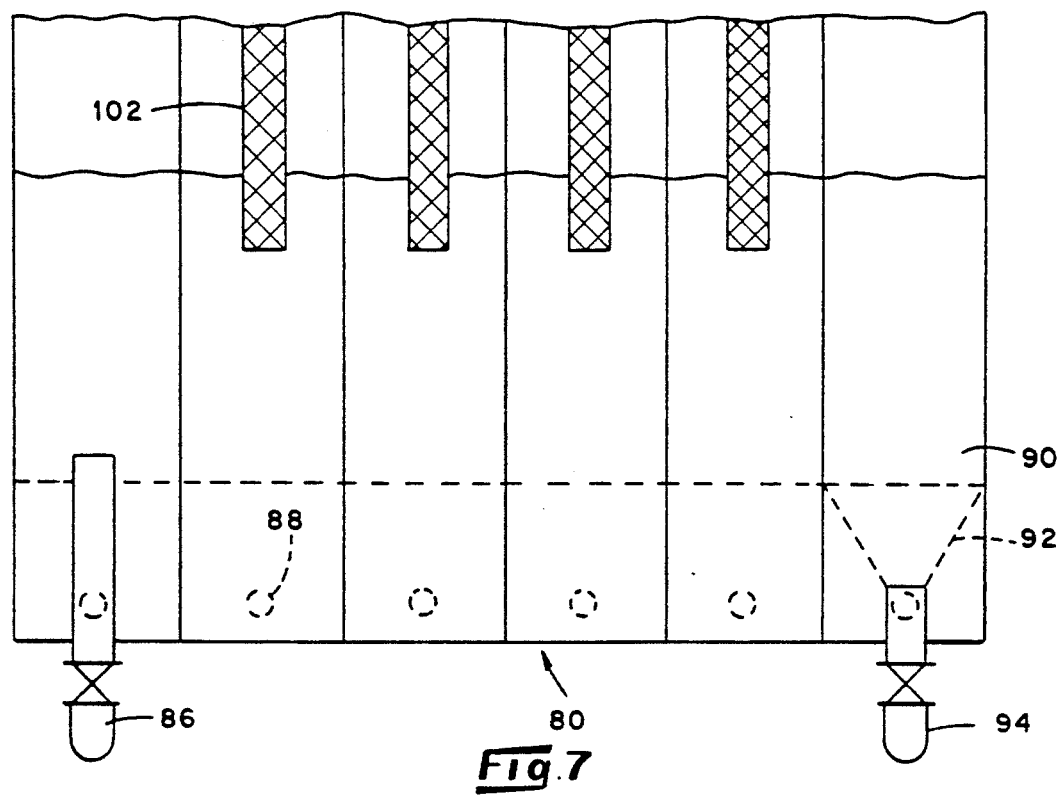
FIG. 7 is a vertical cross-section, in schematic form, of the desulfurization portion of the embodiment of FIG. 6 taken at 7—7 thereof.
Figure 8:
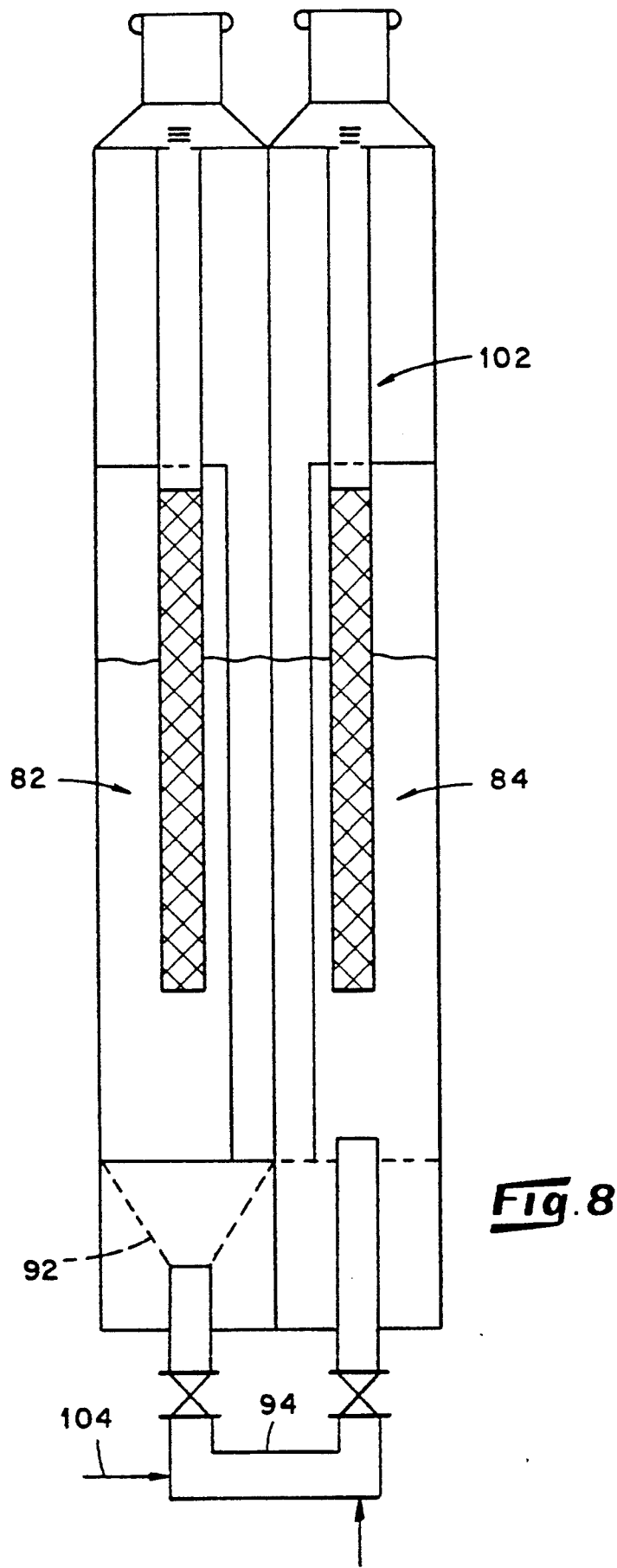
FIG. 8 is a vertical cross-section, in schematic form, of the embodiment of FIG. 6 taken at 8—8 thereof.

Although the apparatus 11 was designed primarily for the treatment of waste in order to substantially reduce the quantity for ultimate disposal, a very similar structure can be used for hot gas desulfurization/sorbent regeneration. A modified apparatus for this purpose is illustrated generally at 80 of FIGS. 6–8. Gas desulfurization takes place in a first fluidized-bed reactor 82, while sorbent regeneration occurs in an adjacent fluidized-bed reactor 84. These reactors contain baffles, as at 85, for the purpose of preventing direct throughput. The hot gas is introduced, as at 86, into the first of these reactors together with an appropriate sorbent (as will be known to persons skilled in the art). The sorbent is moved, together with the gases, through the various stages using the same type of gas distributors 88 as utilized in the device 11 described above. The used sorbent is withdrawn from the last stage 90 through a conical discharge 92 and transferred to the sorbent regeneration portion 84 through a transport line 94. The multi-stage fluidized bed regeneration of the sorbent continues until the regenerated material reaches a last stage 96 such that it is transferred via a conical discharge 98 back to the desulfurization portion 82 via transfer line 100 for re-use. Gases are withdrawn from the desulfurization portion 82 and the regeneration portion 84 via suspended metal filters 102 of the same type as used for waste combustion. Separated gas from portion 82 is substantially free from sulfur, and the separated gas from portion 84 is sent to a conventional sulfur dioxide removal process. As in the earlier described apparatus 11, solids transport through transfer lines is accomplished by the introduction of air, as indicated at 104.

Figure 9:
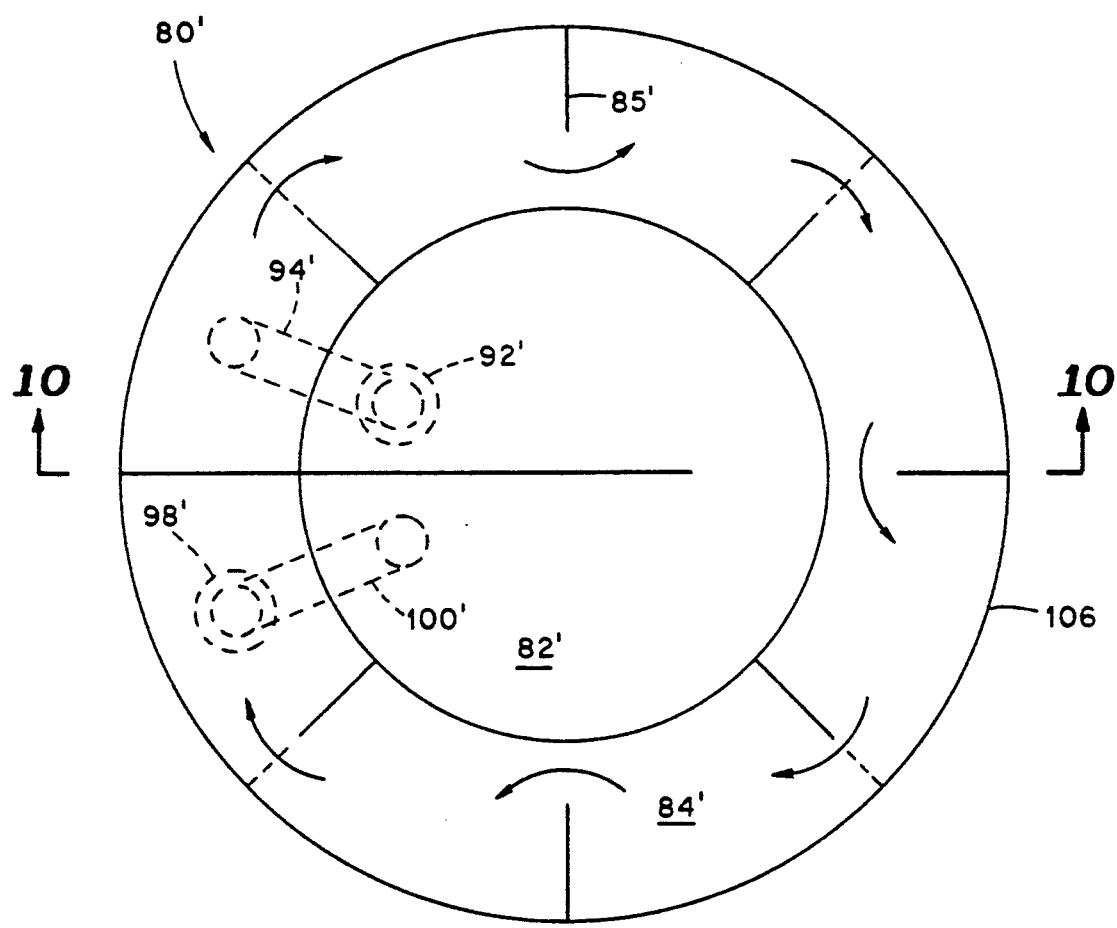
FIG. 9 is a horizontal cross-section, in schematic form, of another embodiment of a device for desulfurization, in particular high pressure hot gas desulfurization.
Figure 10:
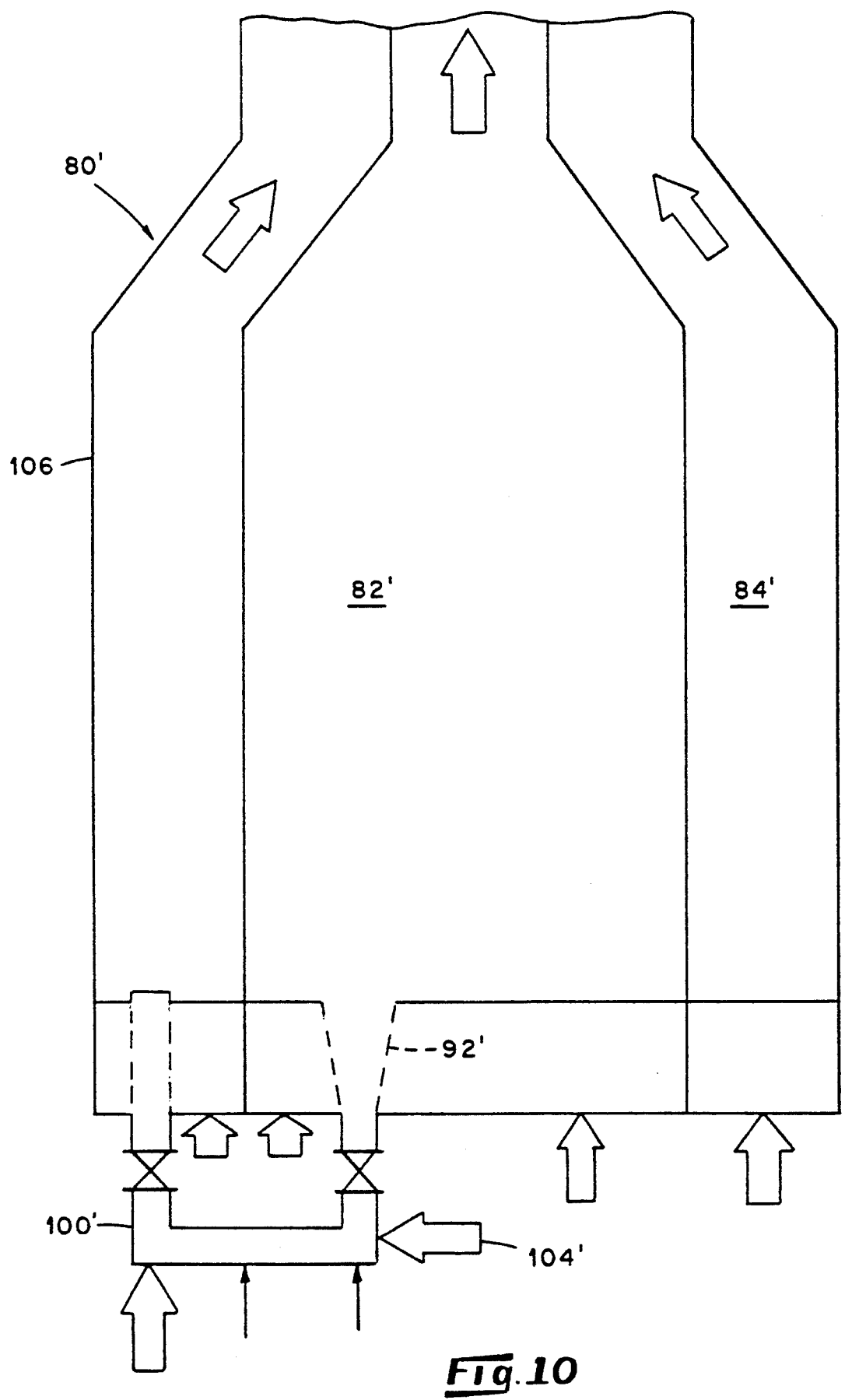
FIG. 10 is a vertical cross-section, in schematic form, of the device illustrated in FIG. 9 taken at 10—10 thereof.

An alternate embodiment of apparatus for desulfurization and sorbent regeneration is shown at 80' in FIGS. 9 and 10. In this embodiment 80', the fluidized beds are concentric and form a cylindrical vessel 106. The desulfurization fluidized bed 82' is positioned concentrically within the sorbent regeneration fluidized bed 84'. The same type of solids transport lines 92', 98' are utilized, as well as the transport lines 94', 100', as in the embodiment 80 of FIGS. 6–8.

It will be apparent to those versed in the art that embodiment 11, embodiment 80 or embodiment 80' can be used for oil shale retorting and combustion. Fresh shale retorts in one reactor and release the kerogen which is cleaned from the particulate matter through the filters before going to the recovery system. Spent shale moves down through the different stages and is drained at the last stage. It is then pneumatically transported to the first stage of the adjacent combustor. During travel through the stages, the spent shale will burn to completion through the use of controlled air addition in the various gas plenum chambers. Heat generated through combustion will be transferred through the wall into the fluidized bed for retort. Heat in any ash material can be transferred to fresh oil shale through solids recirculation via appropriate transfer lines.

The fluidizing gas for the various embodiments of the present invention will vary depending upon the particular application. In the case of use as a pyrolyzer/combustor for radioactive waste, the gas typically would be a mixture of an inert gas such as carbon dioxide and/or nitrogen and sufficient oxygen to carry out the pyrolysis in the pyrolysis bed or combustion in the combustor. In the case of radioactive waste incineration, all gases coming off of the combustor (or any combustion process) would be condensed cryogenically and checked for radioactivity prior to release to the atmosphere. In such a case, it would be efficient to use some of the condensed carbon dioxide as an inert gas. Mixed with oxygen, it would be fed to both the pyrolyzer and combustor. The inert gas controls the temperature of the bed and provides sufficient gas flow to fluidize the bed.

In the incineration of less hazardous wastes, it may not be necessary to condense the off-gases. In this case, the inert gas could be either nitrogen or recirculated flue gas which has not been condensed and cryogenically separated. The flue gas would be a mixture of nitrogen, carbon dioxide and water vapor.

Then the apparatus is used for desulfurization, the fluidizing gas in the absorber side is a fuel gas produced by any gasification process. It would typically contain hydrogen, carbon monoxide, carbon dioxide, water vapor, and perhaps nitrogen. In the regeneration side, the fluidizing gas would typically be a mixture of steam and air or oxygen.

For other types of processing, the fluidizing gas would be selected for the particular process, and the specific gas or gases will be known by persons skilled in the art of that particular process.

Igniting combustion, where necessary, in a fluidized bed can be accomplished in several ways which are known to persons skilled in the art. With the apparatus of the present invention, the simplest way is to premix some natural gas with the fluidizing gas (e.g., air) and ignite this mixture at the bed surface while the bed is in a non-fluidized state. The resultant flame will heat the bed surface through radiant energy to a temperature where the bed particles will be sufficiently hot to ignite the fuel/air mixture. This will also increase the velocity of the fluidizing gas. In this way, the flame will progress down through the bed as it heats. This method is a conventionally used method in many fluidized bed combustion systems.

An alternate method of ignition is to use a liquid fuel sprayed on the top or the bed, much like lighting a charcoal cooker. Still another method is to externally preheat the fluidizing gas, passing this gas through the bed for a sufficient perior to heat the bed.

In a similar manner, the velocity of the bed will depend upon the particular application for the apparatus. Typically, it can be on the order of one foot per second superficial velocity. Bed pressure will also vary with the process being considered for the apparatus. In the case of using the bed for incineration of radioactive or hazardous, the bed pressure would typically be less than atmospheric to ensure that if any leaks develop, leakage will be into the bed. In the case of using the bed for desulfurization or as a reactor with less hazardous materials, the bed can be pressurized to meet the needs of the process, increase throughput and/or to decrease the size of the reactor.

From the foregoing, it will be recognized by persons skilled in the art that a system for the fluidized bed treatment of many materials has been developed that has certain features and advantages over systems of the prior art.

We claim:

1. A fluidized-bed combustion and filter system, which comprises:
   a first fluidized-bed unit defined by an enclosure formed by a top wall, a bottom wall, and at least one surrounding wall and a common side wall;
   a plurality of internal baffles within said first fluidized bed unit alternately projecting from said at least one side wall and said common side wall, said internal baffles dividing said first fluidized-bed unit into multiple stage compartments with communication between stage compartments;
   a gas inlet port communicating into each stage compartment for introducing gas to fluidize material in said stage compartment to convey said material through said stage compartment;
   an inlet port communicating with a first of said stage compartments for introduction of material to be processed within said first fluidized-bed unit;
   an outlet port communicating with a terminal of said stage compartments for withdrawal of material processed in said first fluidized-bed unit;
   a second fluidized-bed unit defined by an enclosure formed by a top wall, a bottom wall, and surrounding walls, one of said surrounding walls being said common side wall of said first fluidized-bed unit, said common side wall being a terminus for alternating of said baffles of said first fluidized-bed unit;
   a plurality of internal baffles within said second fluidized-bed unit alternately projecting from oppositely-disposed side walls, said internal baffles dividing said second fluidized-bed unit into multiple stage compartments with communication between stage compartments;
   a gas inlet port communicating into each stage compartments of said second fluidized-bed unit for introducing gas to fluidize material in said stage compartments to convey said material through said stage compartments;
   a further inlet port communicating with a first of said stage compartments of said second fluidized-bed unit for introduction of material to be processed within said second fluidized-bed unit;
   a further outlet port communicating with a terminal of said stage compartments of said second fluidized-bed unit for withdrawal of material processed in said second fluidized-bed unit; and
   at least one conduit connecting said first and said second fluidized-bed units for conveying reaction products between said first and second fluidized-bed units.

2. The fluidized-bed combustion and filter system of claim 1 wherein said first fluidized-bed unit is a pyrolysis/combustion unit for burning material introduced into said inlet port, said second fluidized-bed unit is a filter/combustion unit for completing combustion of material and for separating solid and gaseous products arising from combustion, and a plurality of first conduits joining said first and second fluidized-bed units, said first conduits each communicating between a single stage compartment of said first fluidized-bed unit and a single stage compartment of said second fluidized-bed unit, said first conduits each containing at least a screen portion to permit transfer of gaseous products and prevent transfer of solid products between said first and second fluidized-bed units.

3. The system of claim 1 further comprising a transfer conduit connected between said further outlet to said further inlet of said second fluidized-bed unit to recycle material within said second fluidized-bed unit.

4. The system of claim 3 further comprising gas jets within said transfer conduit for enhancing movement of material in said transfer conduit from said further outlet to said further inlet.

5. The system of claim 2 further comprising third conduits communicating between each of said stage compartments of said second fluidized-bed unit and a gas chamber, each of said third conduits fabricated primarily from a screen material to permit passage of gaseous material and prevent passage of solid material to said gas chamber.

6. The system of claim 1 wherein said first and second fluidized-bed units are rectangular vessels in side-by-side configuration sharing said common side wall.

7. The system of claim 1 wherein said first fluidized-bed unit is a cylindrical vessel and said second fluidized-bed unit is an annular vessel surrounding said first fluidized-bed unit, said first and second fluidized-bed units sharing said common side wall.

8. The system of claim 1 further comprising cooling units for preventing a temperature in excess of a selected temperature.

9. The system of claim 1 wherein a transfer conduit interconnects said outlet of said first fluidized-bed unit with said further inlet of said second fluidized-bed unit, and a further transfer conduit interconnects said further outlet of said second fluidized-bed unit with said inlet of said first fluidized-bed unit.

10. A fluidized-bed combustion and filter system for the processing of radioactive waste, said system comprising:

a first fluidized-bed unit defined by an enclosure formed by a top wall, a bottom wall, and surrounding walls, said first fluidized bed unit provided with a plurality of internal baffles alternately projecting from oppositely-disposed side walls, said internal baffles dividing said first fluidized-bed unit into multiple stage compartments with communication between stage compartments;

a gas inlet port communicating into each stage compartment of said first fluidized-bed unit for introducing gas to fluidize material in said stage compartments to convey said material through said stage compartments;

an inlet port communicating with a first of said stage compartments of said first fluidized-bed unit for introduction of radioactive material to be processed within said first fluidized-bed unit, said radioactive material being mixed with sorbent and catalyst;

an outlet port communicating with a terminal of said stage compartments of said first fluidized-bed unit for withdrawal of solid material resulting from pyrolysis/combustion in said first fluidized-bed unit;

a second fluidized-bed unit defined by an enclosure formed by a top wall, a bottom wall, and surrounding walls, one of said surrounding walls being a common side wall with said first fluidized-bed unit, said second fluidized-bed unit being provided with a plurality of internal baffles alternately projecting from oppositely-disposed side walls to divide said second fluidized-bed unit into multiple stage compartments with communication between stage compartments;

further gas inlet ports each said further gas inlet ports communicating into one of said stage compartments of said second fluidized-bed unit for introducing gas to fluidize material in said stage compartments to convey said material through said stage compartments;

a further inlet port communicating with a first of said stage compartments of said second fluidized-bed unit for introduction of further catalyst into said second fluidized-bed unit;

a further outlet port communicating with a terminal of said stage compartments of said second fluidized-bed unit for withdrawal of catalyst conveyed through said second fluidized-bed unit;

a transport conduit connecting said further outlet to said further inlet of said second fluidized-bed unit to recycle catalyst to said further inlet; and a conduit joining each one of said stage compartments of said first fluidized-bed unit with one of said stage compartments of said second fluidized-bed unit, each conduit provided with a screen portion within said first fluidized-bed unit to permit flow of gaseous material and prevent passage of solid material.

11. The system of claim 10 wherein each said conduit has an impervious portion extending through a plenum chamber at a base of each stage compartment of said first fluidized-bed unit into a plenum chamber at a base of each stage compartment of said second fluidized-bed unit and terminating proximate each said further gas inlet ports.

12. The system of claim 10 further comprising gas jets within said transfer conduit for enhancing movement of catalyst in said transfer conduit from said further outlet to said further inlet.

13. The system of claim 10 wherein said first and second fluidized-bed units are rectangular vessels in side-by-side configuration sharing said common side wall.

14. The system of claim 10 further comprising cooling units for preventing a temperature in excess of a selected temperature.

15. The system of claim 2 further comprising further conduits communicating between each of said stage compartments of said second fluidized-bed unit and a gas chamber, each of said further conduits fabricated primarily from a screen material to permit passage of gaseous material and prevent passage of solid material to said gas chamber.

16. The system of claim 15 further comprising a further screen within said gas chamber to prevent passage of solid material and permit passage of gaseous material.

17. A fluidized-bed combustion and filter system for the desulfurization of hot gasses, said system comprising:

a first fluidized-bed unit defined by an enclosure formed by a top wall, a bottom wall, and surrounding walls, said first fluidized bed unit provided with a plurality of internal baffles alternately projecting from oppositely-disposed side walls, said internal baffles dividing said first fluidized-bed unit into multiple stage compartments with communication between stage compartments;

a gas inlet port communicating into each stage compartment of said first fluidized-bed unit for introducing gas to fluidize material in said stage compartments to convey said material through said stage compartments;

an inlet port communicating with a first of said stage compartments of said first fluidized-bed unit for introduction of gas containing sulfur to be processed within said first fluidized-bed unit, said gas containing sulfur being mixed with a sorbent;

an outlet port communicating with a terminal of said stage compartments of said first fluidized-bed unit for withdrawal of sulfur-laden sorbent from said first fluidized-bed unit;

a second fluidized-bed unit defined by an enclosure formed by a top wall, a bottom wall, and surrounding walls, one of said surrounding walls being a common wall with said first fluidized-bed unit, said second fluidized-bed unit being provided with a plurality of internal baffles alternately projecting from oppositely-disposed side walls to divide said second fluidized-bed unit into multiple stage compartments with communication between stage compartments;

further gas inlet ports each said further gas inlet ports communicating into one of said stage compartments of said second fluidized-bed unit for introducing gas to fluidize used sorbent in said stage compartments to convey said used sorbent through said stage compartments;

a further inlet port communicating with a first of said stage compartments of said second fluidized-bed unit for introduction of further sulfur sorbent into said second fluidized-bed unit;

a further outlet port communicating with a terminal of said stage compartments of said second fluidized-bed unit for withdrawal of regenerated sorbent conveyed through said second fluidized-bed unit, said further outlet port in fluid communication with said inlet port of said first fluidized-bed unit;

a transport conduit connecting said outlet of said first fluidized-bed unit to said further inlet of said second fluidized-bed unit to transport sulfur-laden sorbent to said further inlet; and a gas removal conduit associated with each stage compartment of said first and second fluidized-bed units to convey desulfurized gas to a gas chamber, each said gas removal conduit having a screen portion to provide for passage of gaseous materials and prevent passage of solid materials from said first and second fluidized-bed units.

18. The system of claim 17 wherein said first fluidized-bed unit is a cylindrical vessel and said second fluidized-bed unit is an annular vessel surrounding said first fluidized-bed unit, said first and second fluidized-bed units sharing a common wall.

19. The system of claim 17 wherein said transport conduit is provided with gas jets to assist in transport of sulfur-laden sorbent from said first fluidized-bed unit to said second fluidized-bed unit.

* * * * *